Aug. 16, 1938.                    W. M. BILLING                    2,126,944
                PREPARATION OF POLYBASIC ACIDS OR ANHYDRIDES
                            Filed June 6, 1936
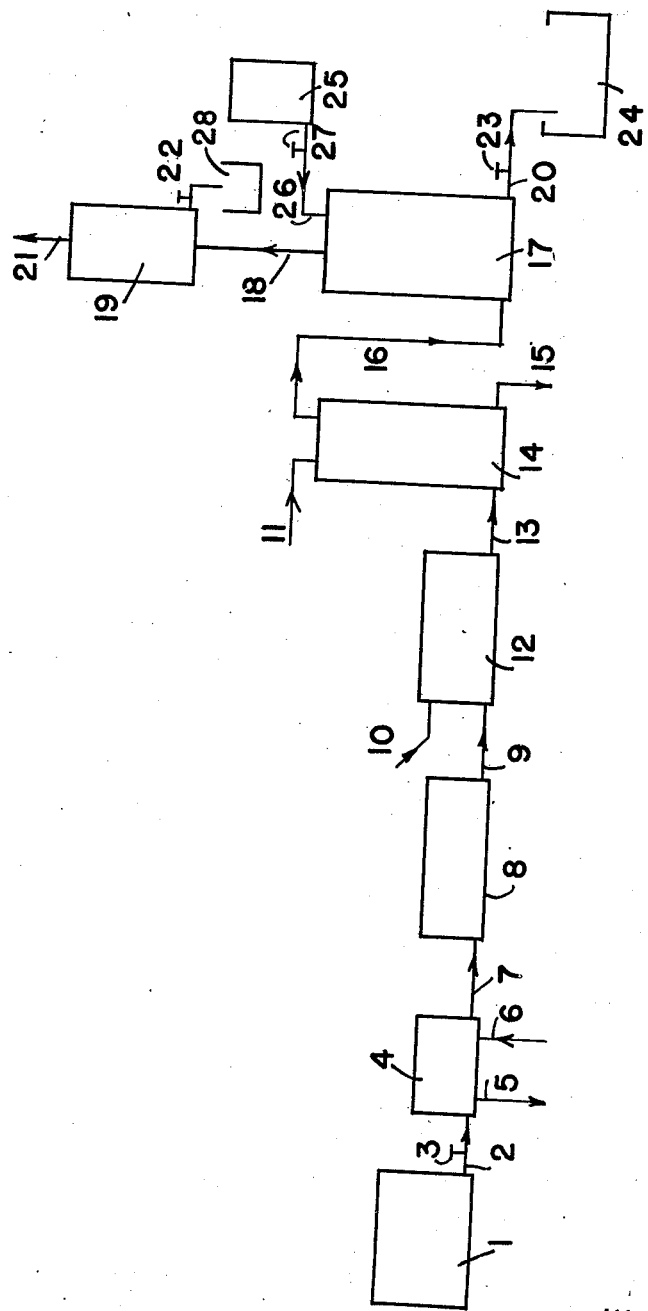
INVENTOR
Wyly M. Billing
BY
ATTORNEYS Patented Aug. 16, 1938

2,126,944

UNITED STATES PATENT OFFICE 2,126,944

PREPARATION OF POLYBASIC ACIDS OR ANHYDRIDES

Wyly M. Billing, Kennett Square, Pa., assignor to Hercules Powder Company, Wilmington, Del., a corporation of Delaware Application June 6, 1936, Serial No. 83,889

6 Claims. (Cl. 260—341)

This invention relates to a process of preparation of polybasic acids, polybasic anhydrides and mixed polybasic acid anhydrides, and more particularly to methods of preparation of resinous polybasic acids and anhydrides.

Heretofore, resinous polybasic acids or their anhydrides, and more particularly those of the maleic anhydride-diëne type, have been made by combining by heating together in the liquid phase a diëne and an organic compound containing the —C=C—CO— group. Such polybasic acids or anhydrides may be converted into alkyd resins by esterification with polyhydric alcohols, and may be modified by admixture with rosin, vegetable oils, higher fatty acids, organic carboxylic acids, etc.

Preparation of resinous polybasic acids, or their anhydrides, has heretofore required the use of relatively pure ingredients. For example, the terpinene-maleic anhydride, rosin-maleic anhydride, pinene-maleic anhydride, and the like, have been made by reaction of the given terpene with relatively pure, isolated maleic anhydride, which anhydride has been difficult to obtain in a satisfactory state of purity.

It has heretofore been the practice, in the preparation of maleic anhydride for use in the above reactions, to either absorb the impure gases containing maleic anhydride, from the catalytic oxidation of hydrocarbons, by water or aqueous caustic soda and, after recovery of the maleic acid or acid salt to convert the maleic acid to its anhydride by well known processes. This method is attended with serious corrosion of the metal parts of the apparatus and requires costly materials of construction. Likewise, if the maleic anhydride coming from the oxidation unit, is absorbed as such in an inert anhydrous solvent, the maleic anhydride is recovered as such, but high solvent losses, and consequent high costs, are encountered.

I have found that I may avoid the above-enumerated difficulties by reacting the maleic anhydride-laden gases evolved from the hydrocarbon catalytic oxidation with a diëne type compound in accordance with my improved process, described in all details in the following.

In practicing the process in accordance with my invention, I maintain the maleic anhydride-laden gases, coming, for example, from a hydrocarbon catalytic oxidation chamber, such as, for example, in accordance with the method described and claimed in U. S. Patent No. 1,787,416, issued December 30, 1930, at a temperature above the dehydration temperature of maleic acid, for example, 150° C., to prevent formation of any substantial quantities of maleic acid, and pass this gas, consisting mainly of maleic anhydride, oxides of carbon, nitrogen and organic decomposition products, into a suitable reaction vessel, e. g., a scrubbing tower, containing a terpene in a liquid state capable of reaction under the conditions with the maleic anhydride and at a temperature in the reaction zone below the decomposition point of the polybasic acid formed by said reaction or below the decomposition point of the terpene, for example, about 160° C. to about 200° C.

If desired, the maleic anhydride-laden gas from the oxidation chamber may be first given a suitable purification treatment, for example, scrubbed in a tower by a high-boiling petroleum hydrocarbon at such a temperature that the maleic anhydride and fixed gases pass through without absorption, while the tars and other decomposition products are retained by the hydrocarbon. Such a temperature may be, for example, about 150° C. to about 250° C.

If desired, the maleic anhydride-laden gas from the oxidation chamber may be passed directly into the reaction vessel, there combined with the terpene, and the reaction product then purified by suitable treatment, for example, treatment with activated charcoal, selective solvent, or acid clays.

Where, in the specification and claims hereof, I use the term terpene bodies I means to include terpene bodies such as alpha-terpinene, dipentene, alpha-terpineol, terpin, pinene, terpinolene, and abietic acid, pimaric acid, rosin, organic esters of said acids or of rosin, and alpha-phellandrene.

The process for the manufacture of the resinous polybasic acid or anhydride formed as above, may, if desired be operated as a batch process and the resinous polybasic acids removed from the reaction vessel as a quantity thereof is formed, or, more advantageously, the operation may be made continuous by the use of a reaction vessel in the form, for example, of a packed tower, into which the terpene bodies are passed at the top, and from which the reaction product, liquid under the prevailing conditions, is removed at the bottom.

Since the formation of the resinous polybasic acid or anhydride evolves heat, I may so regulate the addition of reactants to the tower as to maintain the above temperature in the reaction zone of the tower, or I may, if desired, positively add or remove heat from the tower to control its temperature. I may also regulate the flow of terpene bodies so as to control the concentration of resinous polybasic acid or anhydride in the bottom of the tower. When an excess of terpene body above the amount required for reaction with the maleic compounds is used, a solution of the resinous polybasic acid or anhydride in said excess of terpene body will be obtained in the bottom of the tower, and may be drawn off the bottom of the reaction tower as a mixture thereof with the terpene body, in mutual solution. After removal from the reaction tower, such mixture may be treated to remove and recover the excess terpene body therein.

Since the effluent gases leaving the reaction tower consist largely of fixed gases, carrying with them certain quantities of any volatile terpene body added to the tower, I may pass these effluent gases through a cooler and scrubber, to recover said volatile terpene bodies, which may be returned to the reaction tower.

As a specific example of the carrying out of my process, reference is made to the accompanying drawing, in which 1 represents a benzene supply tank, 2 a pipe passing said benzene via control valve 3, to vaporizer 4, maintained at above the boiling point of benzene by steam supply via pipes 5, 6. The benzene vapors then pass via pipe 7 to preheater 8, in which, by heat-exchange, direct heat, or otherwise, the benzene vapors are brought to a temperature of, for example, about 450° C. to about 600° C. The preheated benzene vapors then pass via pipe 9, to oxidation chamber 12, containing a heterogeneous catalyst, for example, vanadium pentoxide on an inert support; and into said oxidation chamber 12 is also passed air, in suitable proportions, via air inlet 10. In catalyst chamber 12 the mixture of benzene vapor and air, or the oxygen of the air, is converted, by partial catalytic oxidation, into a mixture of maleic anhydride and a certain amount of maleic acid, a certain amount of tars, and fixed gases, e. g., oxides of carbon, and the nitrogen entering with the air.

The mixture of gases and vapors leaves catalyst chamber 12 via pipe 13, and enters the bottom of scrubber tower 14, passing upwardly therethrough, and meeting a stream of heavy hydrocarbon oil, for example, entering scrubbing tower 14 via pipe 11, passing downwardly through tower 14 and leaving via exit 15. The purified gases, free from tars, then pass via pipe 16 to the bottom of reaction tower 17, maintained, as heretofore described, at a temperature of about 150° C. to about 250° C., a temperature range suitable to bring about chemical condensation of the terpene body or terpenes entering from supply tank 25 via pipe 26 and valve 27, and the maleic acid or anhydride contained in the vapors. The condensation product, a terpene body-maleic anhydride, is molten at the prevailing temperature in the tower, and passes downward, collecting in the bottom of reaction tower 17 from which it is removed via pipe 20, and valve 23, to collecting tank 24.

Any unreacted gases or vapors in reaction tower 17 may be drawn off therefrom via pipe 18 to condenser-scrubber 19, the condensate removed via pipe and valve 22 to receiver 28, any water present separated from the condensate, and the latter returned, if desired, to the reaction zone. The fixed gases pass to waste via pipe 21.

Thus my improved process for the preparation of resinous polybasic acids or their anhydrides avoids the necessity of separation or isolation and purification of maleic acid or maleic anhydride, and affords an extremely simple and economical method for their preparation.

It will be understood that, in the present invention, polybasic acids and their anhydrides may be used equivalently, and that the product produced may be either an acid or an acid anhydride.

What I claim is:

1. Method of preparation of a terpene-maleic anhydride condensation product which includes passing a gaseous mixture containing maleic anhydride vapors, and produced by partially oxidizing a hydrocarbon by means of oxygen-containing gases, into contact with a terpene body at a sufficiently high temperature to cause a condensation reaction of the maleic anhydride with the terpene body, and removing the remaining gases from contact with the thus formed condensation product.

2. Method of preparation of a terpene-maleic anhydride condensation product which includes passing a gaseous mixture containing maleic anhydride vapors, and produced by partially oxidizing a hydrocarbon by means of oxygen-containing gases, into contact with a high-boiling petroleum hydrocarbon at such temperature that the maleic anhydride and fixed gases pass through without absorption, then into contact with a terpene body at a sufficiently high temperature to cause a condensation reaction of the maleic anhydride with the terpene body, and removing the remaining gases from contact with the thus formed condensation product.

3. Method of preparation of a terpene-maleic anhydride condensation product which includes passing a gaseous mixture containing maleic anhydride vapors, and produced by partially oxidizing a hydrocarbon by means of oxygen-containing gases, into contact with a terpene body at a temperature within the range about 160° C. to about 200° C., and removing the remaining gases from contact with the thus formed condensation product.

4. Method of preparation of terpinene-maleic anhydride condensation product which includes passing a gaseous mixture containing maleic anhydride vapors, and produced by partially oxidizing a hydrocarbon by means of oxygen-containing gases, into contact with terpinene at a temperature within the range about 160° C. to about 200° C., and removing the remaining gases from contact with the thus formed condensation product.

5. Method of preparation of pinene-maleic anhydride condensation product which includes passing a gaseous mixture containing maleic anhydride vapors, and produced by partially oxidizing a hydrocarbon by means of oxygen-containing gases into contact with pinene at a temperature within the range about 160° C. to about 200° C., and removing the remaining gases from contact with the thus formed condensation product.

6. Method of preparation of a rosin-maleic anhydride condensation product which includes passing a gaseous mixture containing maleic anhydride vapors, and produced by partially oxidizing a hydrocarbon by means of oxygen-containing gases, into contact with rosin at a temperature within the range of about 160° C. to about 200° C., and removing the remaining gases from contact with the thus formed condensation product.

WYLY M. BILLING.